United States Patent [19]

Hasegawa et al.

[11] Patent Number: 5,376,992
[45] Date of Patent: Dec. 27, 1994

[54] PHOTOCURRENT CHARGE TYPE EXPOSURE MEASURING APPARATUS

[75] Inventors: Jun Hasegawa; Takashi Miida; Katsuo Kawamura, all of Miyagi, Japan

[73] Assignee: Fuji Photo Film Co., Ltd., Tokyo, Japan

[21] Appl. No.: 114,394

[22] Filed: Sep. 1, 1993

[30] Foreign Application Priority Data

Sep. 2, 1992 [JP] Japan .................. 4-234803

[51] Int. Cl.⁵ .............................................. G03B 7/08
[52] U.S. Cl. .................................................. 354/426
[58] Field of Search .................. 354/425, 426, 427; 356/215, 223; 250/214 L, 214 DC

[56] References Cited

U.S. PATENT DOCUMENTS

4,184,151  1/1980  Iwata .......................... 354/426 X
4,843,419  6/1989  Sato ............................ 354/426

Primary Examiner—W. B. Perkey
Attorney, Agent, or Firm—Sughrue, Mion, Zinn, Macpeak & Seas

[57] ABSTRACT

An output current of a photodiode is charged in a capacitor, and the voltage change of the capacitor is monitored by a plurality of comparators. The time required for the capacitor voltage to reach a predetermined value is counted by using a clock signal input unit for inputting a clock signal of a predetermined frequency, and a counter for counting an upper part of a number corresponding to a logarithm of a number of clocks of the clock signal generated after the integration start by a photoelectric conversion unit. The outputs of the comparators when the counter counts the upper part are latched, and the lower part of the number is supplied.

11 Claims, 7 Drawing Sheets

PHOTOCURRENT CHARGE TYPE EXPOSURE MEASURING APPARATUS

BACKGROUND OF THE INVENTION a) Field of the Invention

The present invention relates to an exposure measuring apparatus, and more particularly to an exposure measuring apparatus to be used for the exposure control of a camera.

b) Description of the Related Art

The exposure of a camera is generally expressed by a number of 2 raised to some power in order to match the luminosity and broaden the dynamic range. To this end, circuit elements having a logarithmic conversion function are used commonly. A photometric sensor is fabricate, on a semiconductor chip with other devices such as an automatic focus (AF) sensor and various other controlling, measuring, or processing circuits.

Figure 3:
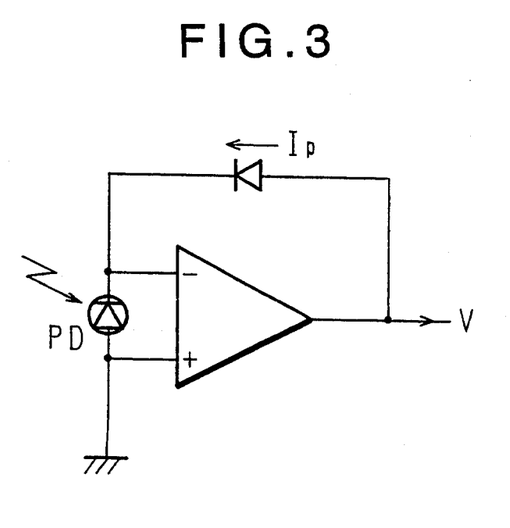
FIG. 3 is a circuit diagram of a conventional exposure measuring apparatus.

As a photometric sensor, a photodiode is generally used. An output of the photodiode is logarithmically converted and measured. An example of a photometric circuit is shown in FIG. 3. A photodiode PD is connected across the input terminals of an operational amplifier.

The relationship between a phtocurrent Ip and an electromotive force V of a photodiode PD is well known and given by:

$$Ip \simeq \exp(qV/kT) - 1 \simeq \exp(qV/kT).$$

A voltage across the photodiode is therefore expressed by a logarithm of a current. The current flowing through the photodiode is proportional to the intensity of incident light so that an output of the operational amplifier is also proportional to the logarithm of the intensity of incident light.

The photocurrent Ip is typically expressed as a number including a term of 2 raised to some power such as:

$$Ip \simeq I_0 2^{qV/kt}.$$

An output voltage V of the photodiode is therefore given by:

$$V \simeq (kT/q)\log_2 Ip - (kT/q)\log_2 I_0$$
$$= (kT/q)\log_2 Ip - V_0,$$

where q is an electric charge elementary quantity, k is the Boltzmann constant, T is an absolute temperature, and Vo is an offset voltage.

In general, the photocurrent Ip of a photodiode substantially independent of temperature changes (and hardly changes with temperature), except that the photocurrent is affected by a temperature change in the band gap of semiconductor. However, as is apparent from the above equation, the output voltage of a photodiode changes greatly in proportion to temperature. As the temperature changes, the output of the operational amplifier does not represent the logarithm of the intensity of incident light.

From this reason, the conventional exposure sensor having the circuit shown in FIG. 3 requires a temperature compensating circuit in addition to the photometric circuit.

A temperature compensating circuit requires a complicated circuit arrangement, resulting in a large chip area. It is therefore difficult to integrate these circuits as well as other devices such as an AF sensor on the same chip.

There arise therefore problems such as an increased number of chips, a high cost, and an obstacle against compactness.

SUMMARY OF TILE INVENTION

It is an object of the present invention to provide an exposure measuring apparatus to be used for exposure control, which apparatus is not necessary to perform temperature compensation and which is small in circuit size.

According to one aspect of the present invention., there is provided an exposure measuring apparatus having: means for inputting a clock signal of a predetermined frequency; photoelectric conversion means for photoelectrically converting an exposure into a photocurrent, and outputting a voltage signal representing integrated electric charges of the photocurrent; judging means for comparing the voltage signal outputted from the photoelectric conversion means with M predetermined reference voltages, and outputting M judgement signals indicating whether the voltage signal is higher than the M predetermined reference voltages; first count means for counting an integer part of a number corresponding to a logarithm of a number of clocks of the clock signal generated after the integration start by the photoelectric conversion means; and means for obtaining the fractional part of the number from the judgement signals of the judging means supplied immediately before, when the voltage signal reaches a maximum reference voltage among the M predetermined reference voltages.

The photoelectric conversion means integrates the photocurrent itself so that it hardly receives the influence of a temperature change. For the logarithmic conversions, the number corresponding to a logarithm of clocks of the clock signal is counted until the integrated value of the photocurrent reaches a predetermined value. The fractional part of the logarithm can be measured by using output signal of M judgement means.

It is therefore possible to provide a high precision exposure measuring apparatus with a simple circuit structure, and to integrate it with other devices such as an AF sensor on the same chip.

DETAILED DESCRIPTION OF THE PREFERRED EMBODIMENTS

The fundamental operation of an exposure measuring apparatus will be described with reference to FIG. 1.

A photocurrent that is hardly susceptible to the influence of a temperature change is used. The time required for the photocurrent to reach a predetermined value is logarithmically measured, the time being proportional to the inverse of an incident light intensity. The inverse of the logarithm corresponds to a negative number. Therefore, as the measured value, a negative number of the logarithm of the incident light intensity is obtained.

A photocurrent is integrated, for example, by charging it in a capacitor serially connected to a photodiode. A voltage V appearing across the capacitor is compared with a reference voltage. A measurement time is logarithmically counted by a log counter, and the brightness of a subject is expressed by a brightness value BV conforming with the APEX system (additive system of photographic exposure).

A light flux F incident to a photoelectric conversion element can be given by the following equation:

$$F = F_0 * 2^{BV} \qquad (1)$$

where Fo is a constant determined by an optical system.

Figure 1:
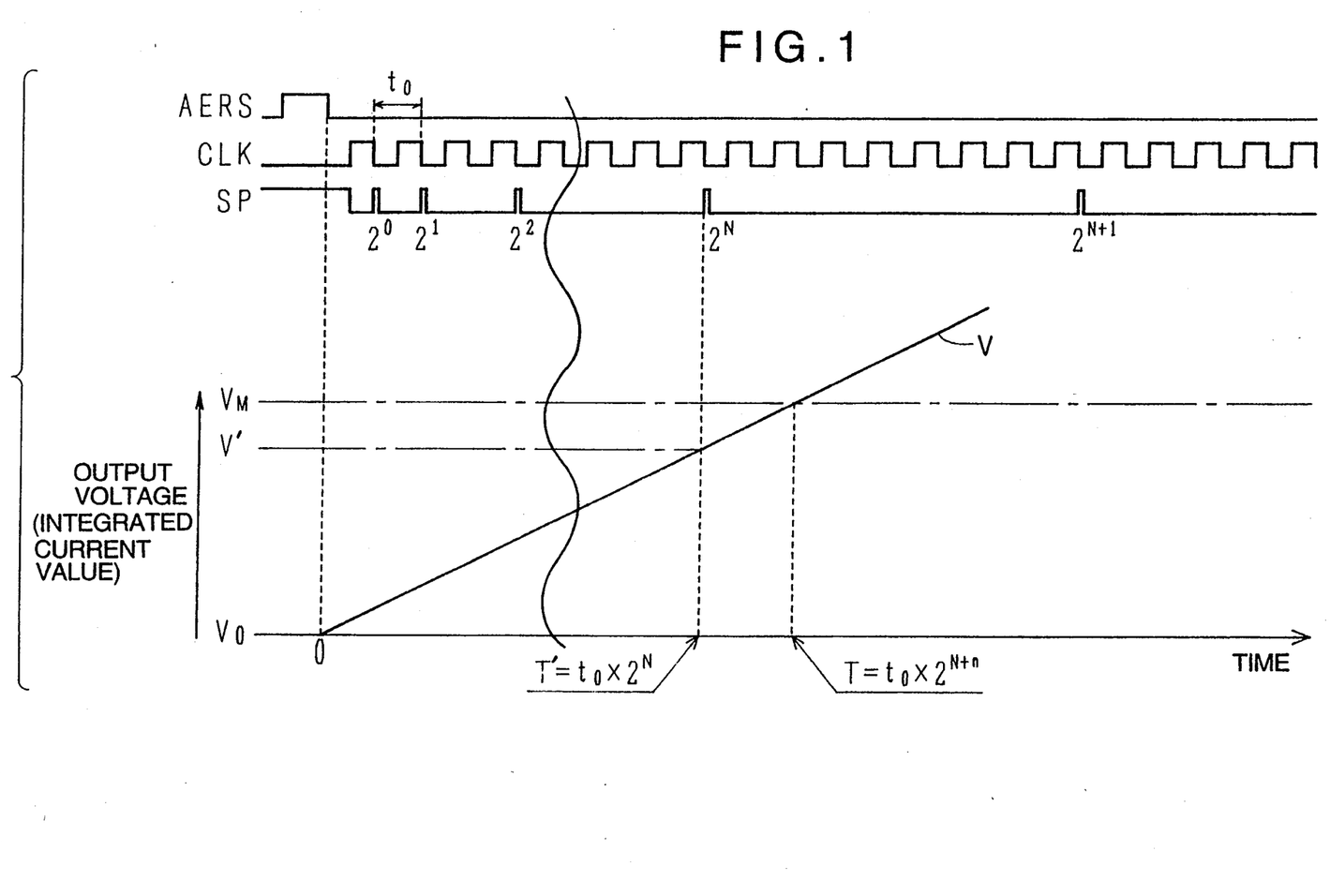
FIG. 1 shows waveforms explaining the fundamental operation of an exposure measuring apparatus.

Assuming that the incident light flux F does not change with time, an output voltage V of an integration type photoelectric conversion element linearly increases as the time lapses as shown in FIG. 1, and is given by the following equation:

$$V = A * F * t \qquad (2),$$

where A is a sensitivity of the photoelectric conversion element, and t is an integration time. The output voltage V is proportional to the integrated light amount.

Representing the time when the voltage V reaches a predetermined voltage (maximum reference voltage) $V_M$ after reset, by T, the relationship between T and BV suffices the following equation:

$$V_M = A * F_0 * T * 2^{BV} \qquad (3).$$

Therefore, BV is obtained by counting the integration time T. The values A and Fo are known. The integration time T is logarithmically obtained by a logarithmic conversion type counter which counts clock pulses of a period t0. This time T as shown in FIG. 1 is given by:

$$T = t_0 * 2^{N+n} \qquad (4).$$

where N is a positive integer, and n is a positive fraction. The following equations are satisfied when the output voltage reaches $V_M$ at the integration time T:

$$T = t_0 * 2^N * 2^n = T' * 2^n$$

$$T' = t_0 * 2^n$$

$$V_M = A * F_0 * t_0 * 2^N * 2^n * 2^{BV} \qquad (5)$$

The integer part N and fractional part n can be measured separately.

Referring to FIG. 1, time T' ($= t_0 * 2^N$) is measured by an output SP of the counter which is incremented by "1" each time it counts the i-th (i=0, 1, 2, ...) power of 2 of the clock pulses CLK of the period to. Namely, the number N corresponds to the number of outputs SP counted until the output voltage V of the photoelectric conversion element reaches the voltage $V_M$. In the logarithmic scale, it becomes:

$$log_2 T = log_2 T' + n$$

$$n = log_2(T/T').$$

Therefore, obtaining the fractional part n corresponds to obtaining $log_2(T/T')$.

An output V' when the integration time T' is ($t_0 * 2^N$), is given from the equation (2) by:

$$V' = A * F_0 * T' * 2^{BV} = A * F_0 * t_0 * 2^N * 2^{BV} \qquad (6).$$

From the equation (3) of $V_M = A * F_0 * T * 2^{BV}$ and the equation (6), the following equation is given:

$$log_2(T/T') = log_2(V_M/V') = n \qquad (7).$$

As a result, if $V_M/V'$ is obtained by a number expressed by 2 raised to some power, the value n can be obtained immediately. Since $V_M$ is a constant, it is sufficient if the output voltage V' when the clock pulses of $2^N$ are counted is obtained by a number expressed by 2 raised to some power.

The value n can be obtained in the form of n=m/M if the range from the maximum reference voltage $V_M$ to the offset voltage Vo is digitized in M sections by the logarithmic scale of 2 raised to some power. As a result, the BV is given from the equation (5) by:

$$BV = -[N + (m/M)] + log_2(V_M/A * F_0 * t_0) \qquad (8)$$
$$= -[N + (m/M)] + BV_0.$$

A constant $BV_0$ can be known in advance from the values Vo, A, Fo, and to. The value M is also a constsant so that the BV can be obtained from the measured values of N and m.

In the above manner, an exposure can be measured without using a conventional logarithmic amplifier, i.e., without using a temperature compensation circuit.

Figure 2:
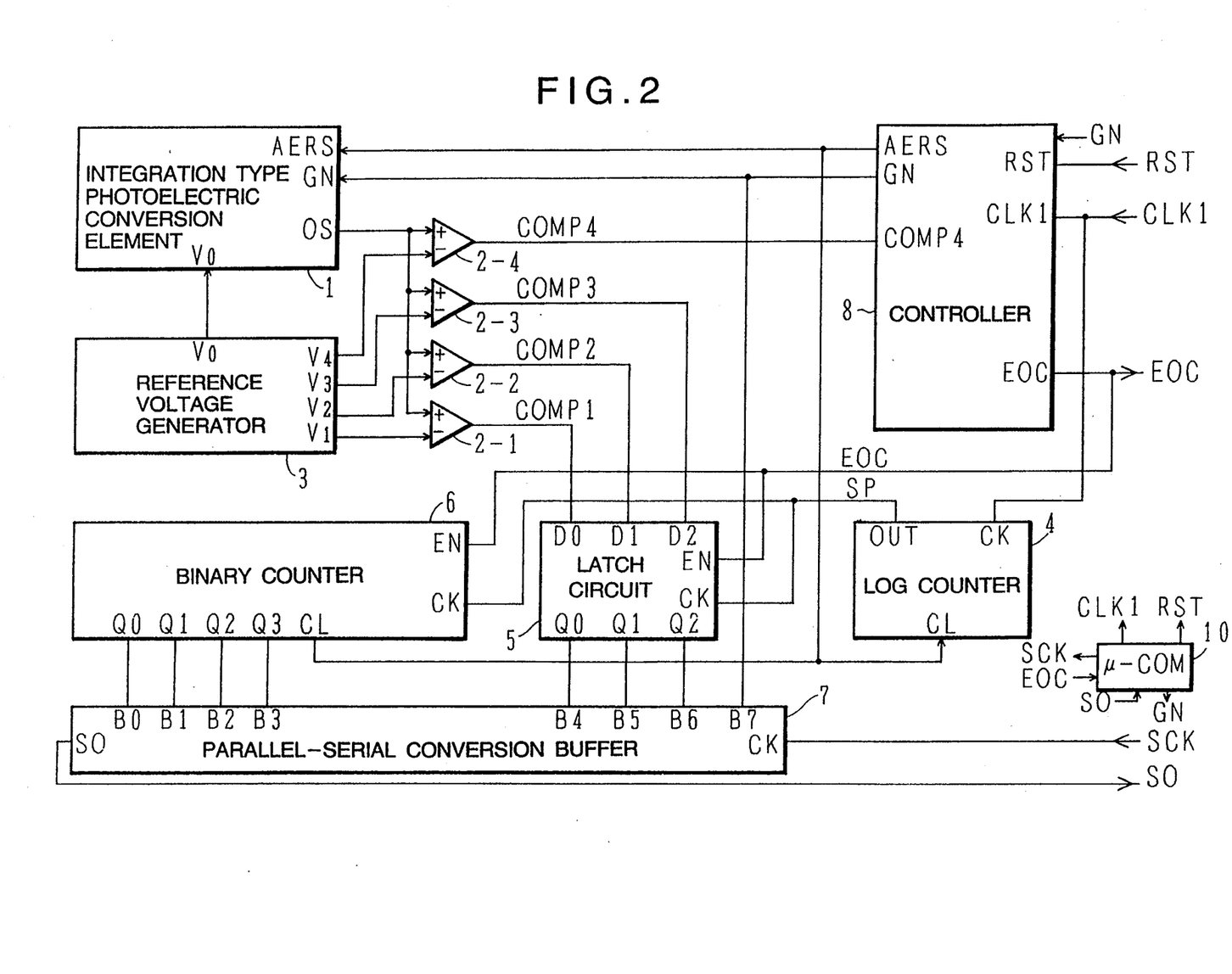
FIG. 2 is a block diagram of an exposure measuring apparatus according to an embodiment of the present invention.

The exposure measuring apparatus according no an embodiment of the invention will be described with reference to FIG. 2. In FIG. 2, reference numeral 1 represents an integration type photoelectric conversion element which outputs a voltage corresponding to the integrated value of incident light fluxes. When an automatic exposure reset signal AERS is set to a high level, an output signal OS of the element 1 is reset to a reference voltage Vo. Thereafter, the AERS signal is set to a low level to start the integration of a photocurrent. The photoelectric conversion element 1 then outputs a voltage OS corresponding to the integrated value.

The sensitivity of the photoelectric conversion element 1 can be set to one of two levels in response to a gain select signal GN. In this embodiment, the sensitivity ratio is set to 1:4. The high sensitivity is selected when GN is set to the high level, and the low sensitivity is selected when it is set to the low level.

Reference numerals 2-1, 2-2, 2-3, and 2-4 represent comparators which compare the output OS of the photoelectric conversion element 1 with respective reference voltages $V_1$ to $V_4$ and output the comparison result signals COMP1 to COMP4.

A reference voltage generator 3 generates the reference voltages $V_1$ to $V_4$. The reference voltages of the four comparators are set to the following voltages having the values which divide the logarithmic scale into four equally divided sections:

$$V_1 = (V_4 - V_o) * 2^{1/4}/2 + V_o$$

$$V_2 = (V_4 - V_o) * 2^{2/4}/2 + V_o$$

$$V_3 = (V_4 - V_o) * 2^{3/4}/2 + V_o$$

$$V_4 = (V_4 - V_o) * 2^{4/4}/2 + V_o = V_4$$

A log counter 4 is reset by the AERS signal applied to its clear terminal CL, and thereafter starts counting clock pulses inputted to its CK terminal. When the count reaches a number equal to the i-th power of 2 (i =0, 1, 2, ...), a sampling pulse SP is outputted from its OUT terminal.

A latch circuit 5 receives at its input terminals D0 to D2 the outputs COMP1 to COMP3 from the comparators 2-1 to 2-3, latches the outputs COMP1 to COMP3 when the sampling pulse SP is supplied from the log counter 4, and outprofs the latched data from its Q0 to Q2 terminals. An enable signal terminal EN receives an enable signal which determines whether the inputted sampling pulse SP is valid or not. The sampling pulse SP is made valid only when the enable signal takes the high level.

A 4-bit binary counter 6 is reset by the AERS signal applied to its clear terminal CL, and thereafter starts counting the sampling pulses SP. Similar to the circuit, an enable signal terminal En of the binary counter 6 receives the enable signal which determines whether the inputted sampling pulse SP is valid or not.

A parallel-serial buffer 7 converts parallel data into serial data which is outputted from a serial signal output terminal SO synchronously with a serial clock SCK externally supplied to its clock input terminal CK. The parallel data inputted to the buffer 7 includes eight bits, i.e., four bits of the outputs Q0 to Q3 from the binary counter 6, three bits of the outputs Q0 to Q2 from the latch circuit 5, and one bit of the gain select signal GN.

A controller 8 controls the above-described blocks 1 to 6. For example, it receives externally a reset signal RST for resetting the photometric sensor (exposure measuring apparatus) and a master clock signal CLK1, and outputs an exposure end signal EOC when the output COMP4 is receive, from the comparator 2-4.

The photometric sensor circuit is mounted on a camera by connecting signals RST, CLK1, EOC, SCK, and SO to a microcomputer of the camera, and controlled by this microcomputer.

The operation of the photometric sensor will be described with reference to the timing chart shown in FIG. 4 and the block diagram of FIG. 2. When the reset signal RST is supplied from the microcomputer, the controller 8 supplies the AERS signal to the intergration type photoelectric conversion element 1 synchronously with the rising edge of the master clock signal CLK1, to thereby reset the element 1 and thereafter start the integration.

At the same time, the controller 8 sets the EOC signal to the high level to inform the external circuit that the photometric operation starts. The gain select signal GN is set to, for example, the high level to select the high sensitivity.

The AERS signal is also supplied to the log counter 4 and binary counter 6 to reset the counters. After the falling of the AERS signal, the log counter start counting the falling edges of the clocks CLK obtained by dividing the master clock signal CLK1. The log counter 4 supplies the sampling pulse SP to the binary counter 6 and latch circuit 5 every time it receives a numer of clocks CLK corresponding to the number of i-th power of 2. Although the clock pulses CLK divided from the master clock signal CLK1 are used, it is obvious that the master clock pulses CLK1 may be used directly as the clock CLK.

The binary counter 6 starts counting the sampling pulses SP because the EOC signal supplied to the enable signaL terminal EN takes the high level. The EOC signal of the high level is also supplied to the enable signal terminal EN of the latch circuit 5. Therefore, the latch circuit latches the outputs COMP1 to COMP3 from the comparators each time the sampling pulse SP is inputted, update latched data, and outputs them from its output terminals Q0 to Q2.

An output OS of the photoelectric conversion element 1 takes a value Vo immediately after the reset, and raises its voltage as the photocurrent is integrated. The output COMP4 of the comparator 2-4 takes the low level at the initial stage because the signal OS is lower than the voltage $V_4$. Thereafter, the signal OS becomes greater then the maximum reference voltage $V_4$. At this time, the output COMP4 is inverted and takes the high level.

At the rising edge of the output COMP4, the EOC signal falls so that after this timing the low level is supplied to the enable signal terminals EN of the binary counter 6 and latch circuit 5. The binary counter then stops the count operation and holds the number of sampling signals SP having been counted before the EOC signal falls. The count represented by the values Q0 to Q8 of the binary counter 6 corresponds to a voltage V' as seen from the equation (6), and corresponds to the (negative) integer part N of the BV value of the subject as seen from the equation (8).

The latch circuit 5 holds the data latched by the sampling pulse SP immediately before the failing edge of the EOC signal. This latched data is four-step digitized data when the pulse SP immediately before the fall ing edge of the EOC signal is inputted to the latch circuit 5, and corresponds to the (negative) fractional part m/M (in this embodiment, m/4) of the BV value. The correspondence between the outputs Q0 to Q2 of the latch circuit 5 and the values m/M is shown in Table 1.

TABLE 1

| Q2 | Q1 | Q0 | Fractional Part of BV Value (Compliment) |
|---|---|---|---|
| 0 | 0 | 0 | 0/4 |
| 0 | 0 | 1 | 1/4 |
| 0 | 1 | 1 | 2/4 |
| 1 | 1 | 1 | 3/4 |

After the falling of the EOC signal, tile outputs of the binary counter 6 and latch circuit 5 have been established, and the photometric data is established at this time.

If the photometric sensor is to be controlled by a microcomputer 10, a serial output synchronizing signal SCK is sent to the conversion buffer 7 after the microcomputer 10. detects the falling edge of the EOC signal.

Synchronously with the clock SCK, the conversion buffer 7 outputs, from its SO terminal, 8-bit data including 4-bit outputs from the binary counter 6, 3-bit outputs from the latch circuit, and one bit of the gain information (GN signal). In accordance with N and $n=(m/M)$ represented by the 8-bit data, the microcomputer calculates $BV=BVo-[N+(m/M)]$ and obtains the BV.

Next, the GN signal will be described which is a signal for selecting the sensitivity of the photoelectric conversion element 1. If the brightness of a subject is high and the comparator 2-4 inverts its output before the binary counter 6 counts the first sampling pulse SP, the microcomputer 10 changes the level of the GN signal from the high level to the low level.

Figure 4:
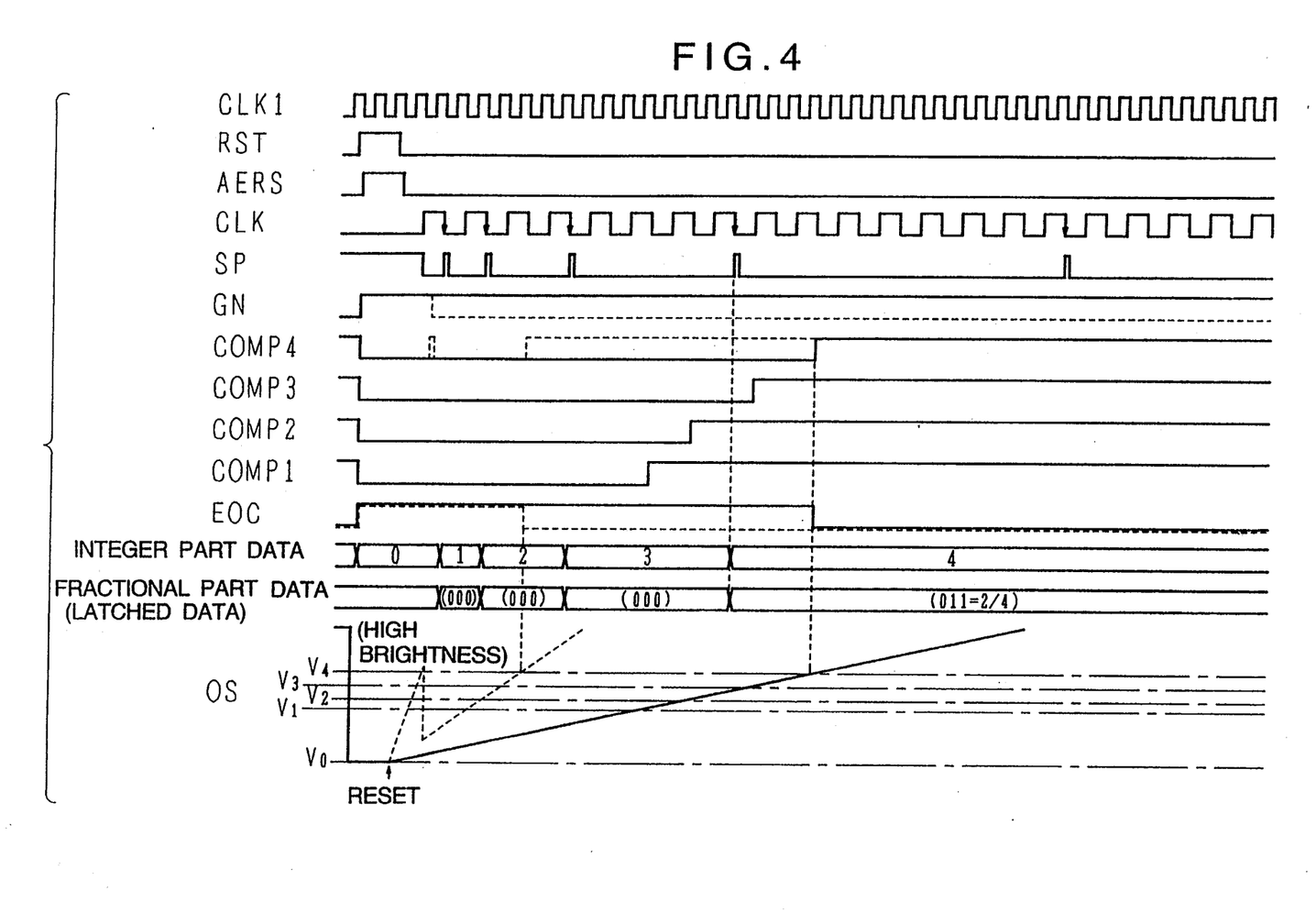
FIG. 4 is a timing chart explaining the operation of the exposure measuring apparatus of the embodiment shown in FIG. 3.

For example, as shown in FIG. 4, when the OS signal indicated by a broken line exceeds the level $V_4$, the COMP4 rises. If the output COMP4 rises before the first sampling pulse SP rises, the GN signal is set to the low level without inverting the EOC signal to lower the sensitivity of the photoelectric conversion element to the initial one-fourth sensitivity. As a result, the output signal OS of the photoelectric conversion element 1 is lowered by one-fourth and the voltage rises thereafter at the initial one-fourth slope.

If the output COMP4 is inverted next, the sequence similar to that described above is performed. In this manner, it is possible to broaden the dynamic range to high brightness side by an amount corresponding to two steps, as compared to the case where the sensitivity is not switched.

The GN signal is outputted as part of the signal SO from the parallel-serial conversion buffer 7 as described previously. The microcomputer 10 can calculate the BV of a subject, by using the output (N) of the binary counter 6, the value (m/M) obtained by decoding the outputs of the latch circuit 5, the gain information (GN), and a pre-calculated offset value (BVo).

For the case of GN=high, $$BV-[N+(m/M)]+BVo,$$

and for the case of GN is low, $$BV-[N+(m/M)]+BVo+2.$$

The term or 2 of the right side of the equation for GN=low indicates a change of the gain by one-fourth.

As shown in FIG. 4, generally the value n does not fully coincide with m/M. In order to minimize such an error, the number M of comparators is increased. The number of comparators may be increased or decreased in accordance with a required precision of the photometric sensor.

Next, the details of each block will be described.

Figure 5:
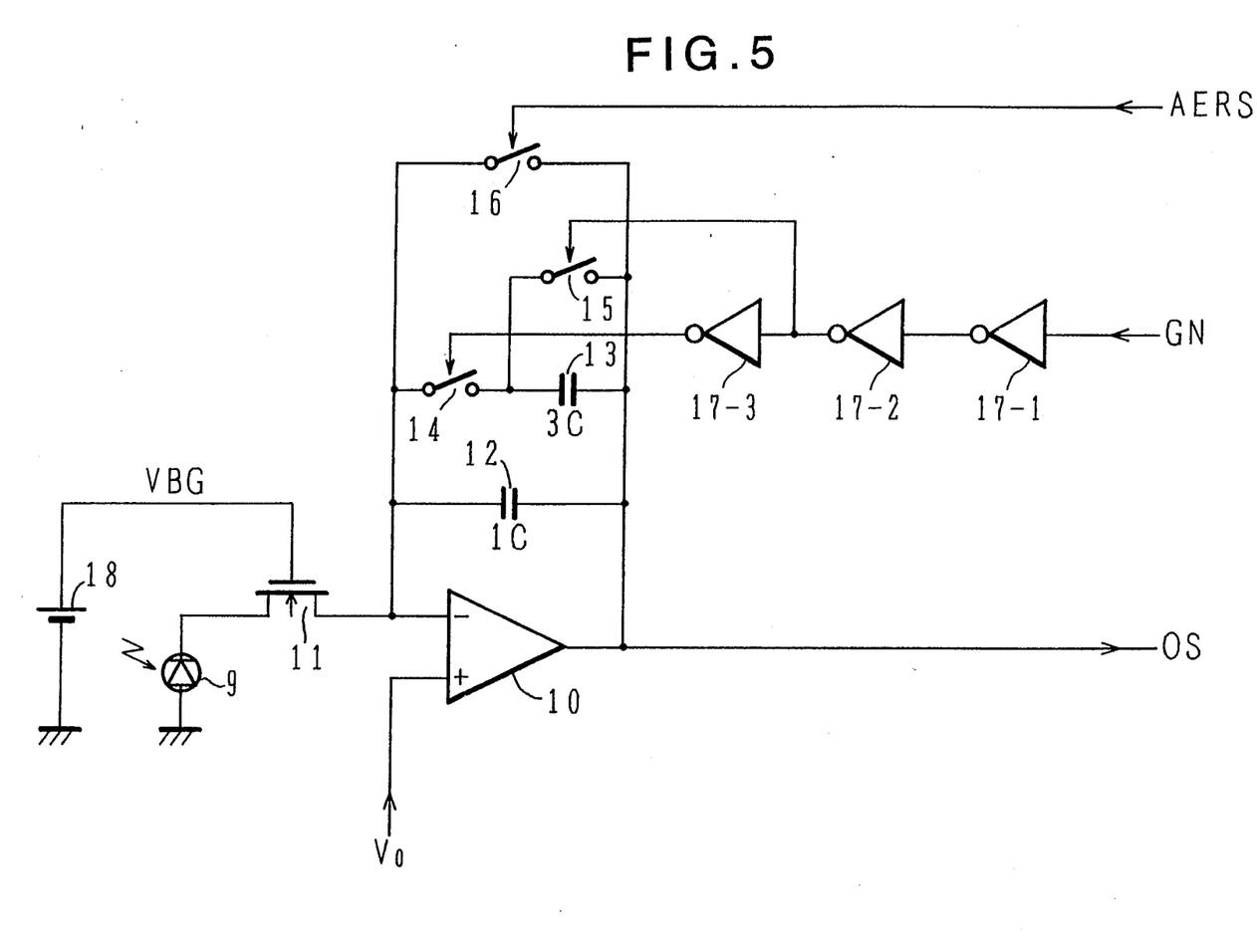
FIG. 5 is a circuit diagram showing the structure of a photoelectric conversion unit used by the exposure exposure measuring apparatus of the embodiment shown in FIG. 3.

FIG. 5 shows the internal structure of the photoelectric conversion element 1. A photodioce 9 is connected via a transistor 11 to the inverting input terminal of an operational amplifier 10. A reference voltage Vo is supplied to the non-inverting input terminal. At the reset of the element 1, the voltage at the inverting input terminal becomes Vo.

A reverse bias voltage of the photodiode 9 is determined by the gate voltage of the transistor 11. In order to minimize dark current, the voltage of a reverse bias source 18 is set to a low value. The transistor 11 is interposed in order to optimize the reverse bias voltage of the photodiode and the operating voltage of the operational amplifier 10.

A capacitor 12 is always connected between the output and inverting input terminals of the operational amplifier 10 and provides a feedback capacitance. A capacitor 13 is selectively connected between the terminals by a switch 14 and provides a gain switching feedback capacitance.

When the switch 14 is turned off, the feedback capacitance is 1C, and when it is turned on, the feedback capacitance is 4C, thereby allowing the gain to be switched at a ratio of 1:4. Electric charges generated in the photodiode 9 are converted into a voltage by the feedback capacitance and outputted.

A switch 16 is connected between the output and inverting terminals of the operational amplifier 10. When the switch 16 is turned on by the AERS signal, the charges in the feedback capacitor 12 are discharged to reset the output voltage to Vo. A switch 15 is used for discharge the electric charges in the gain switching feedback capacitor 13.

An inputted GN signal is supplied via inverters 17-1 and 17-2 to the switch 15 without changing its phase. As shown in FIG. 4, the signal GN takes the high level when the AERS signal is inputted, and discharges the capacitor 13.

The GN signal is also supplied via an inverter 17-3 to the switch 14 to disconnect the capacitor 13. In this state, the total capacitance is 1C corresponding to the high sensitivity.

If the brightness of a subject is high and the GN signal takes the low level, the switch 15 turns off first, and after the delay time of one gate, the switch 14 turns on. With this delay time, it is possible to prevent both the switches 14 and 15 from turning on at the same time and prevent the electric charges in the capacitor 12 from being drained via the switches 14 and 15. After the completion of this operation, the total feedback capacitance becomes 4C to set the sensitivity to the initial one-fourth value.

Next, the structure and operation of the log counter will be described with reference to FIGS. 6 and 7.

Figure 6:
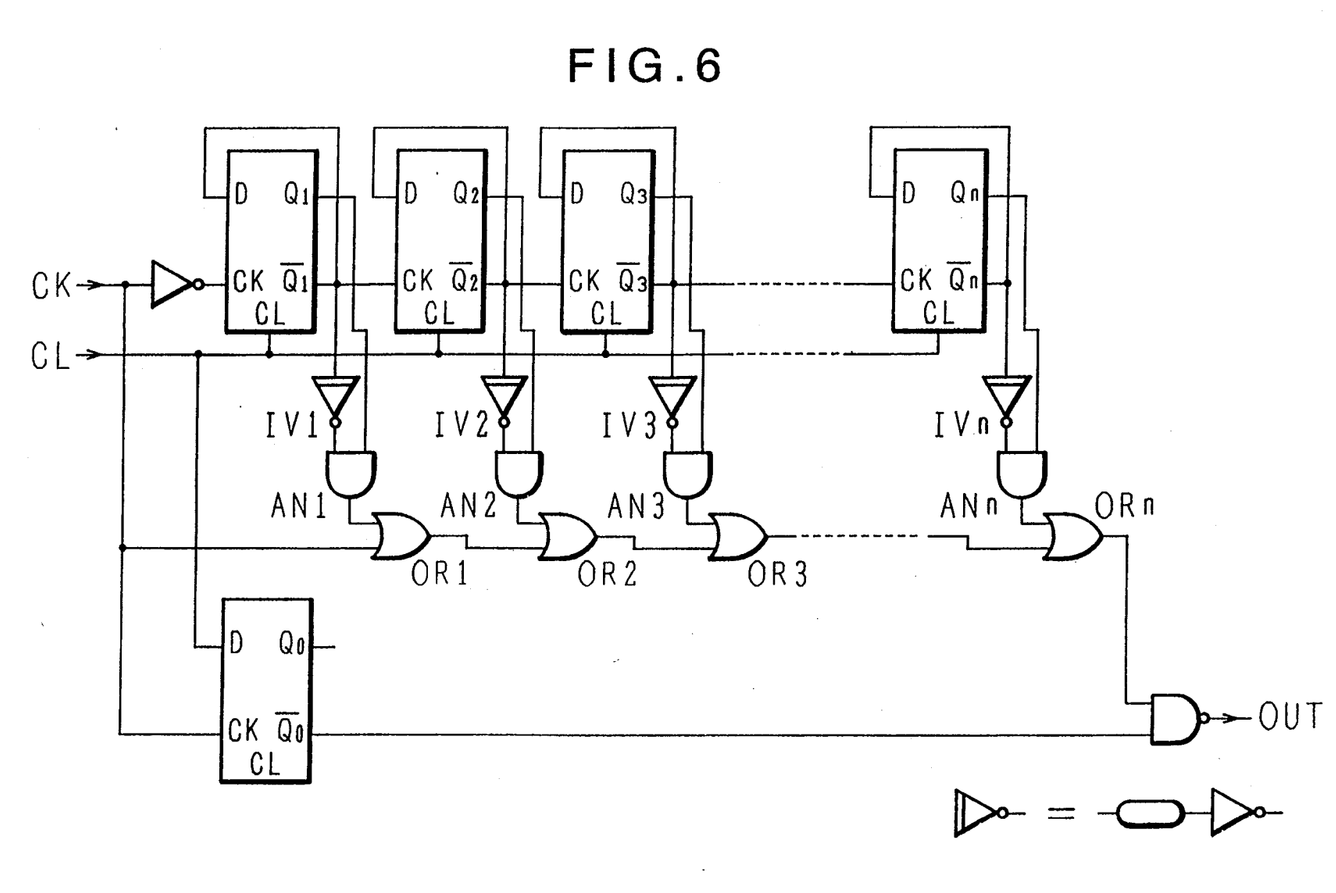
FIG. 6 is a circuit diagram showing the structure of a log counter used by the exposure measuring apparatus of the embodiment shown in FIG. 3.
Figure 7:
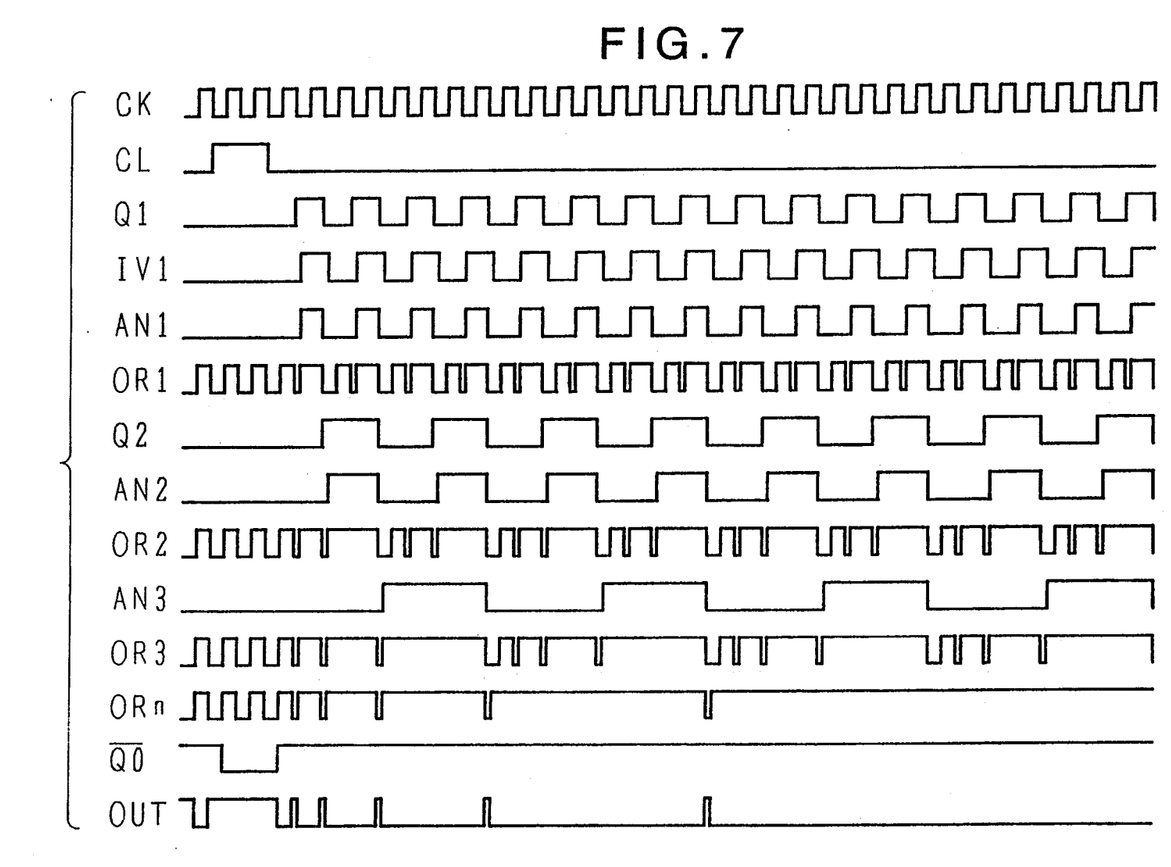
FIG. 7 is a timing chart explaining the operation of the log counter shown in FIG. 6.

FIG. 6 is a circuit diagram showing the structure of the log counter. One stage of the log counter is constructed of a D-FF, a delay inverter IV, an AND gate AN, and an OR gate OR. The Q output of D-FF is supplied to one input of the AND gate, and the inverted Q output is supplied to the CK terminal of the next stage D-FF and to the input terminal of the next stage delay inverter. An output of the delay inverter is supplied to the other input of the AND gate.

An output of the AND gate is supplied to one input of the OR gate whose output is supplied to the other input of the next stage OR gate, The clear terminal CL, of D-FF is supplied with a clear signal CL.

A plurality of n stages are connected in cascade to form a log counte. To the CK terminal of the first stage D-FF, FF, a phase-inverted pulse of the system clock is applied (this log counter is basically a binary up-counter).

The CK terminal of a D-FF without at CL terminal shown in the lower part of FIG. 6 is supplied with the system clock CK, and the D input terminal is supplied with the clear pulse CL. Therefore, a phase-inverted and delayed signal of the CL signal is outputted from the Q output terminal.

The output of this D-FF is supplied to one input of an NAND gate, and the output of the last stage OR gate is supplied to the outer input of the NAND gate. The output of the NAND gate is a final output of the log counter.

The operation of the log counter shown in FIG. 6 will be explained with reference to the timing chart of FIG. 7. Each D-FF is reset by the clear signal CL, and thereafter starts the count operation synchronously with the falling edge of each clock CK. The output Q1 of each D-FF is a division of the clocks CK, and the output IV1 of the delay inverter is a delayed division of the clocks CK. The output AN1 of the AND gate is a logical product of IV1 and Q1.

A logical sum OR1 of the AND gate output AN1 and the clocks CK is pulses which fall for a predetermined time period each time one clock CK is counted. Similarly, a logical sum of the next state AND gate output AN2 and the preceding stage OR gate output OR1 is pulses OR2 which fall for a predetermined time period each Lime two clocks CK are counted.

These operations are repeated to obtain an output OUT of the log counter. This output OUT is a NAND of the final stage output ORn and Q0, and are pluses which fall for a predetermined time each time the clock CL is counted by 1, 2, 4, 8, ..., times.

Although the invention has been described in connection with the preferred embodiment, the scope and spirit of the invention is not limited to the embodiment only, but various modifications are possible.

For example, the operation sequence. described above may be changed to other sequences. In the embodiment sequence, the sensitivity of the photoelectric conversion element is first set to a high sensitivity, and if the brightness of a subject is high, the sensitivity is automatically lowered. Instead of this sequence, a reversed opposite sequence may be used wherein the sensitivity off the photoelectric conversion element is first set to a low sensitivity to start the integration.

If the brightness of a subject is low, there is no problem. If the brightness is low, it takes a relatively long time to measure the exposure. Therefore, if the brightness of a subject is so low that an output of the latch circuit will not rise even after a predetermined number of clock pulses have been counted, the integration is intercepted, and the photometric sensor is reset to set the sensitivity to the high level and the integration is performed again.

A judgement of the brightness of a subject may be checked from whether the EOC signal falls in a predetermined short time period at the initial integration. It preferable to complete this judgement in a short time.

In the above embodiment, an operational amplifier is used in the photoelectric conversion circuit. Other circuit configurations may also be used. For example, a floating diffusion amplifier commonly used as an output amplifier of a CCD, or other circuit devices may also be used. it is apparent that various changes, improvements, combinations and the like may be made by those skilled in the art.

We claim:

1. An exposure measuring apparatus comprising:
    input means for inputting a clock signal of a predetermined frequency;
    photoelectric conversion means for photoelectrically converting an exposure into a photocurrent, integrating said photocurrent, and outputting a voltage signal representing integrated electric charges of said photocurrent;
    judging means for comparing said voltage signal oututted from said photoeletric conversion means with M predetermined reference voltages, and outputting M judgement signals indicating whether said voltage signal is higher than said M predetermined reference voltages;
    first counting means connected to said input means for counting an upper part of a number corresponding to a logarithm of a number of periods of said clock signal generated after beginning the intergation of said photocurrent by said photoelectric conversion means; and
    means connected to said first counting means for temporarily storing said judgement signals supplied from said judging means, and outputting a lower part of said number when said voltage signal reaches a maximum reference voltage among said M predetermined reference voltages, in accordance with said judgement signals obtained immediately before.

2. An exposure measuring apparatus according to claim 1, wherein said M predetermined reference voltages to be supplied to said judgement means are set such that the m-th reference voltage is $(V_M-V_R) * 2^{m/M}/2 + V_R$ where $V_M$ is said maximum reference voltage, and $V_R$ is a reference voltage at the reset time.

3. An exposure measuring apparatus according to claim 1, wherein said photoelectric conversion means comprises:
    a photodiode; and
    an operational amplifier having a noninverting input terminal, an inverting input terminal, and an output terminal, said noninverting terminal being connected to said reference voltage at said reset time, an output of said photodiode being connected to said inverting input terminal, and a parallel circuit of a capacitor and a switch connected between said inverting input terminal and said output terminal.

4. An exposure measuring apparatus according to claim 3, further comprising control means connected to said judgement means and said clock input means for controlling said switch by comparing said judgement signals and said clock signal.

5. An exposure measuring apparatus according to claim 4, wherein said control means controls said switch and changes the number of bits of said number.

6. An exposure measuring apparatus comprising:
    means for inputting a clock signal of a predetermined frequency;
    photoelectric conversion means for photoelectrically converting an exposure into a photocurrent, integrating said photocurrent, and delivering an output signal corresponding to a value of integrated electric charges of said photocurrent;
    sensitivity switching means for switching the sensitivity of said photoelectric conversion means by a plurality of steps;
    a plurality of judging means for comparing said output signal of said photoelectric conversion means with a plurality of predetermined reference signals, and outputting a plurality of judgement signals indicating whether said output signal is greater than said predetermined reference signals;
    first counting means for counting the number of periods of said clock signal and for generating a pulse each time the number of clock periods counted equals a number of 2 raised to the power N (N=0, 1, 2, 3, ...);

second counting means for counting the number of pulses generated by said first counting means until a change is detected in said judgement signal outputted by said judgement means supplied with a largest reference signal among said plurlaity of judgement means;

latch means for latching said judgement signals of said judgement means other than said judgement means supplied with said largest reference signal, immediately before said change is detected; and reset means for resetting said photoelectric conversion means, said first and second counting means, and said latch means to an initial state.

7. An exposure measuring apparatus accordling to claim 6, wherein said sensitivity switching means sets the sensitivity to a lower level in advance, switches the sensitivity to a higher level if no change is detected in all of said judgement signals of said judgement means until a predetermined number of periods of said clock signal have been generated, and thereafter actuates said reset means.

8. An exposure measuring apparatus according to claim 6, wherein said photoelectric conversion means comprises a photodiode;

an operational amplifier having a noninverting input terminal, an inverting input terminal, and an output terminal, said noninverting terminal being connected to a reference voltage source, and an output of said photodiode being connected to said inverting input terminal; and a charging circuit connected between said output terminal and said inverting terminal, said charging circuit being capable of switching between capacitors, and wherein said sensitivity switching means selects said capacitors of said charging circuit by comparing the time when said first counting means counts periods of said clock signal equal to 2 raised to the power N and generates a first pulse with the time when a change is detected in said judgement signal of said judgement means supplied with said largest reference signal.

9. An exposure measuring apparatus according to claim 8, wherein said sensitivity switching means sets the sensitivity to a higher level in advance, switches the sensitivity to a lower level if no change is detected in all of said judgement signals of said judgement means until a predetermined number of periods of said clock signal have been generated, and thereafter actuates said reset means.

10. An exposure measuring method comprising the steps of:

inputting a clock signal of a predetrmined frequency;

applying light to a photodiode and generating a photocurrent;

integrating said photocurrent by charging said generated photocurrent in a capacitor, and outputting a voltage signal representing integrated electric charges of said photocurrent;

comparing said voltage signal with M predetermined reference voltages, and outputting M judgement signals indicating whether aid voltage signal is higher than said M predetermined reference voltages;

counting an upper part of a number corresponding to a logarithm of a number of periods of said clock signal generated after beginning the integration of said photocurrent;

temporarily storing said judgement signals; and outputting a lower part of said number when said voltage signal reaches a maximum reference voltage among said M predetermined reference voltages, in accordance with said judgement signals obtained immediately before.

11. An exposure measuring method according to claim 10, wherein said counting step comprises the steps of counting clock pulses generated at a predetermined period by using a logarithmic counter and a step of supplying a lower count obtained from said voltage across said capacitor immediately before said voltage reaches said predetermined value.

* * * * *